United States Patent [19]
Alessio

[11] 3,731,657
[45] May 8, 1973

[54] ANIMAL CAGE
[76] Inventor: Eugene T. Alessio, 20 Harmony Hills Road, Akron, Ohio 44321
[22] Filed: Apr. 1, 1971
[21] Appl. No.: 130,210

[52] U.S. Cl. .................................... 119/17, 119/19
[51] Int. Cl. ........................................... A01k 01/02
[58] Field of Search ................... 119/17, 18, 19, 22; 128/374

[56] References Cited

UNITED STATES PATENTS

| | | | |
|---|---|---|---|
| 3,246,645 | 4/1966 | Kerns et al. | 128/374 X |
| 3,698,360 | 10/1972 | Rubricius | 119/17 |
| 3,292,582 | 12/1966 | Rubricius | 119/17 |
| 3,122,127 | 2/1964 | Shechmeister et al. | 119/18 |
| 3,367,308 | 2/1968 | Quattrone et al. | 119/18 X |
| 3,490,417 | 1/1970 | Swinney | 119/19 |
| 3,175,534 | 3/1965 | Pollard | 119/19 X |
| 2,881,733 | 4/1959 | Young, Jr. et al. | 119/18 X |
| 3,220,383 | 11/1965 | Bruner | 119/17 |

Primary Examiner—Hugh R. Chamblee
Attorney—Gordon C. Mack

[57] ABSTRACT

At least the lower part of an exercise cage for an animal such as a dog, monkey, etc. is molded of reinforced plastic so that there are no cracks in which fecal matter, bacteria, etc. can collect. The cage is made with a shelf that the animal can get onto while the cage is being flushed out. A drain is provided in the floor.

In addition to the bottom portion, there may be other portions of various constructions. In a preferred cage the walls and roof are solid or made of wire and the cage is provided with a fan in the upper part for ventilation so that air flushed from the cage can be removed from the cage environment. The only opening into this cage is advantageously a single door at the opposite end of the cage from the fan.

In a preferred form of the invention, top and bottom portions of the cage are identical and can be nested for shipment or storage.

Various modifications are disclosed.

16 Claims, 23 Drawing Figures

INVENTOR.
EUGENE T. ALESSIO
BY
*Gordon C. Clark*
ATTORNEY

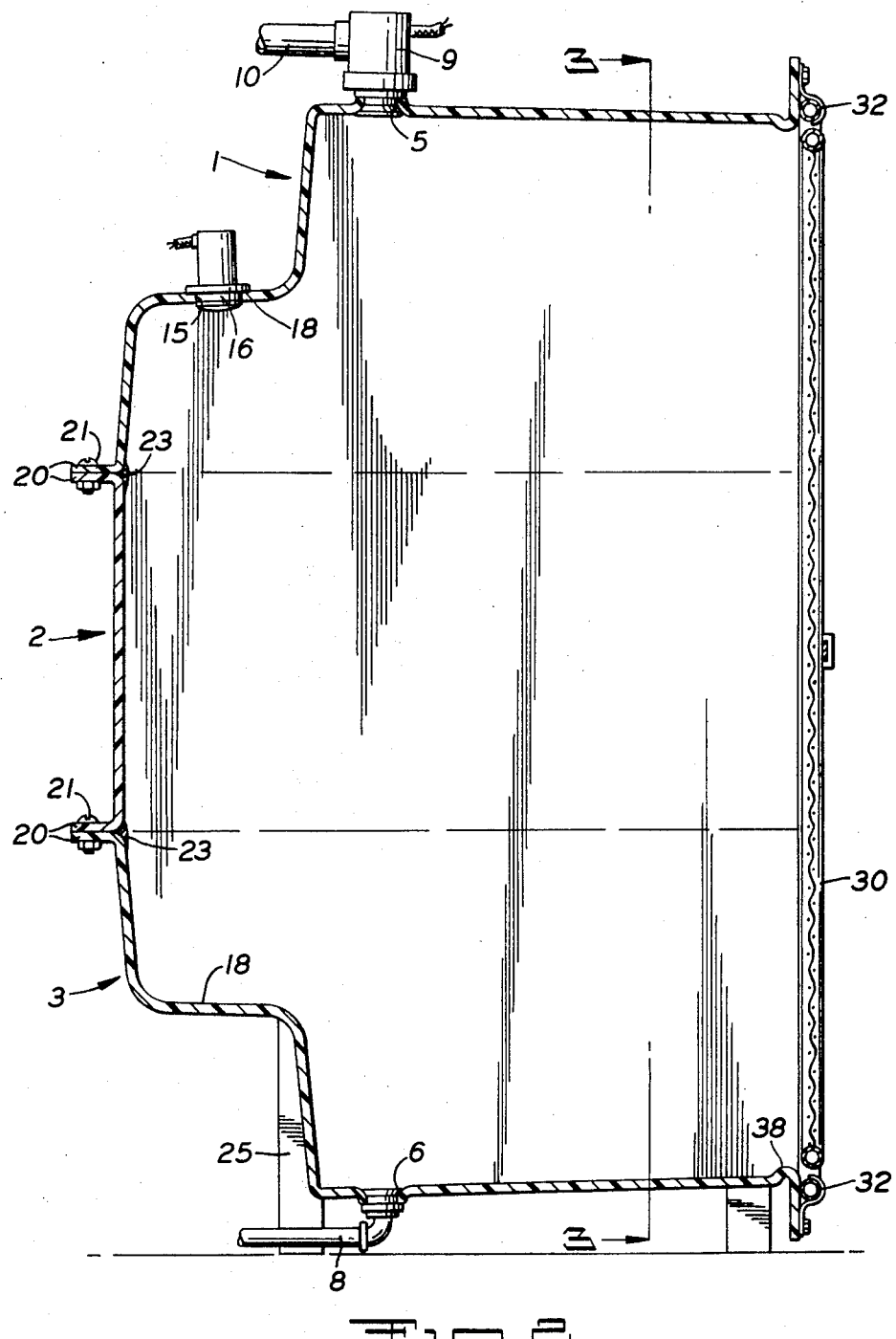

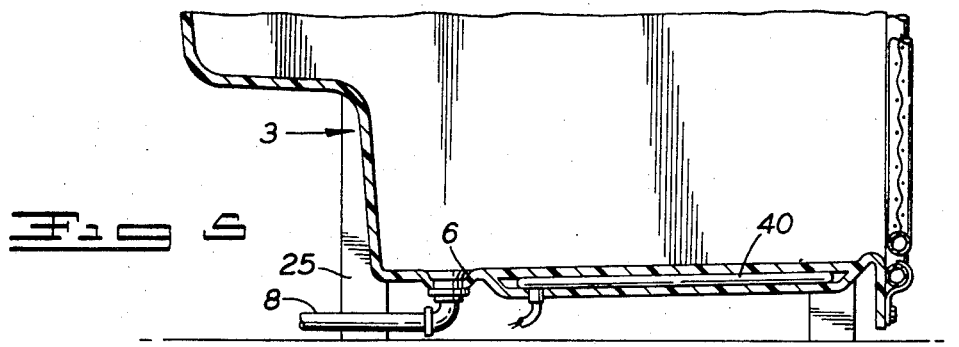
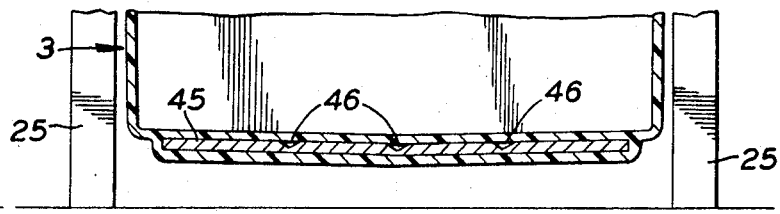
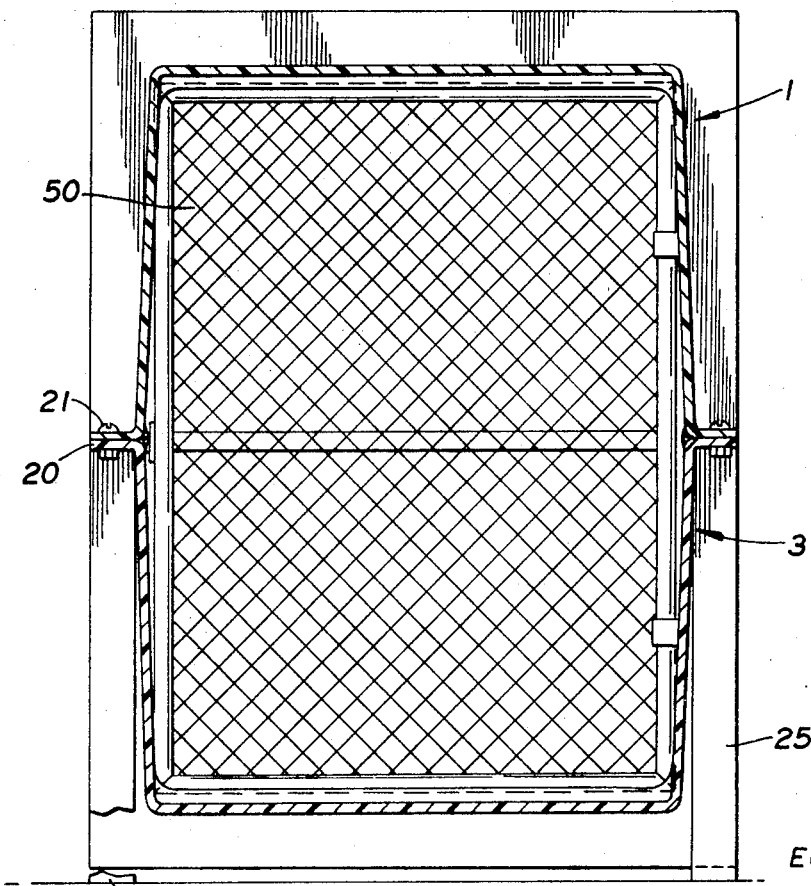
INVENTOR.
EUGENE T. ALESSIO
ATTORNEY

INVENTOR.
EUGENE T. ALESSIO
BY
ATTORNEY

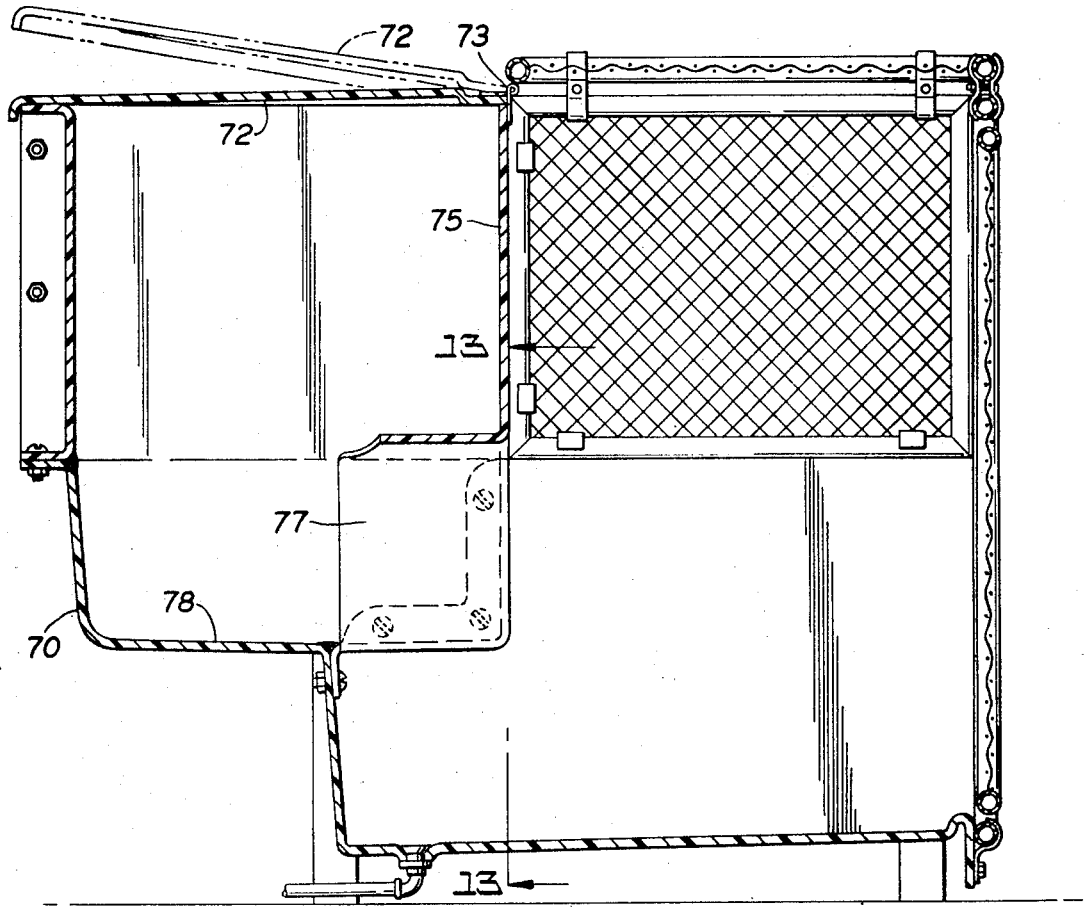
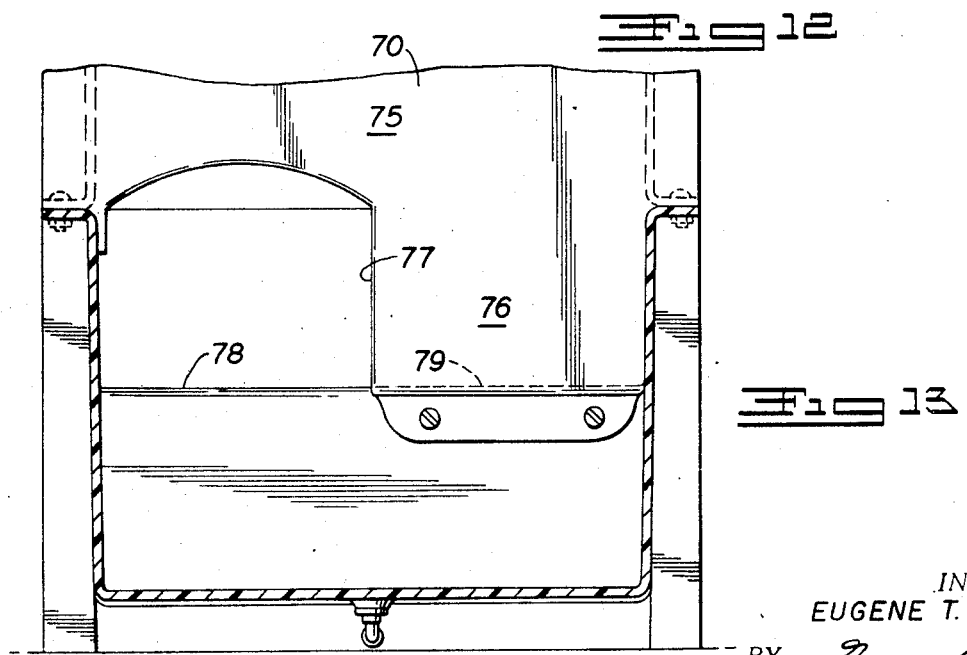

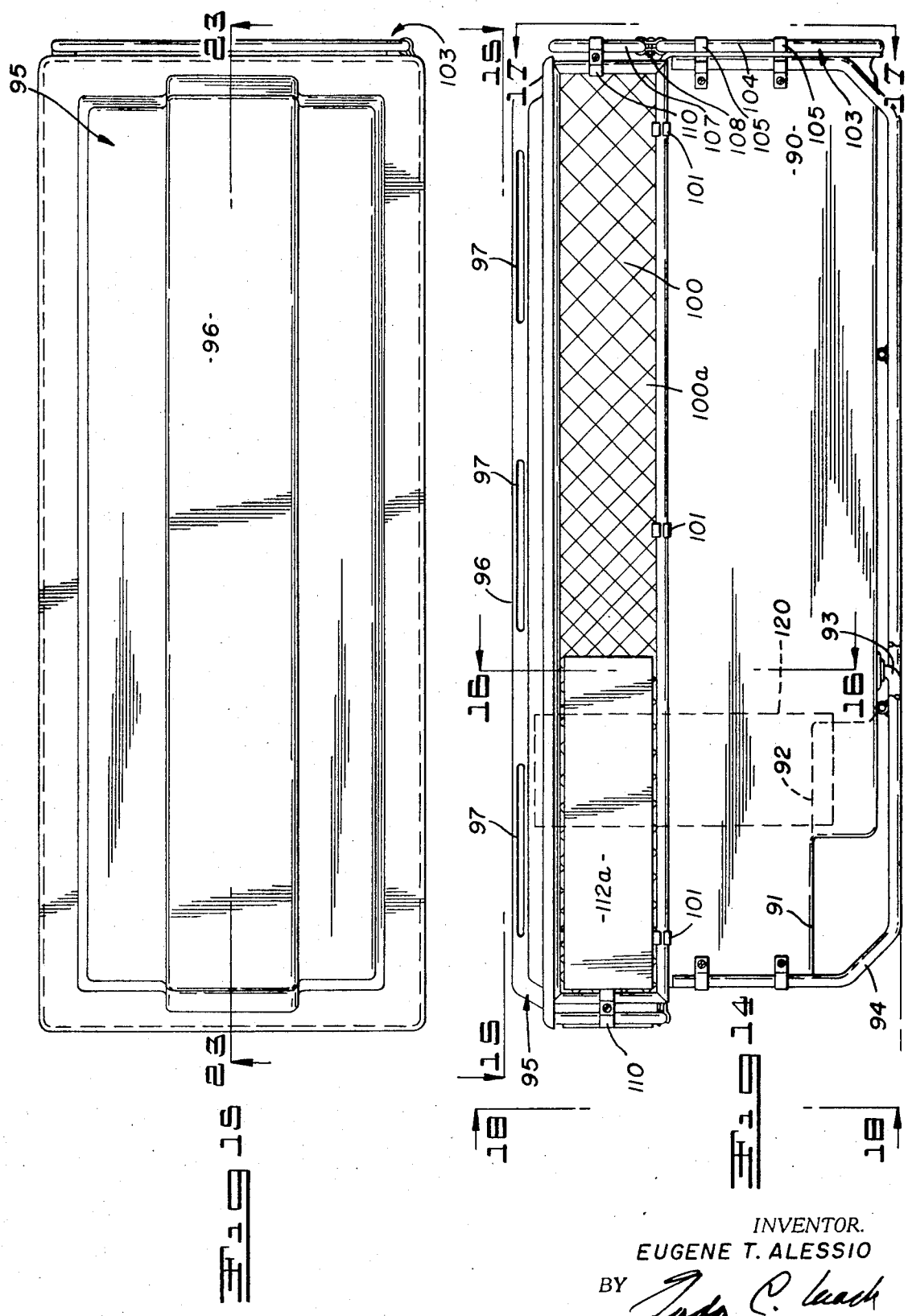

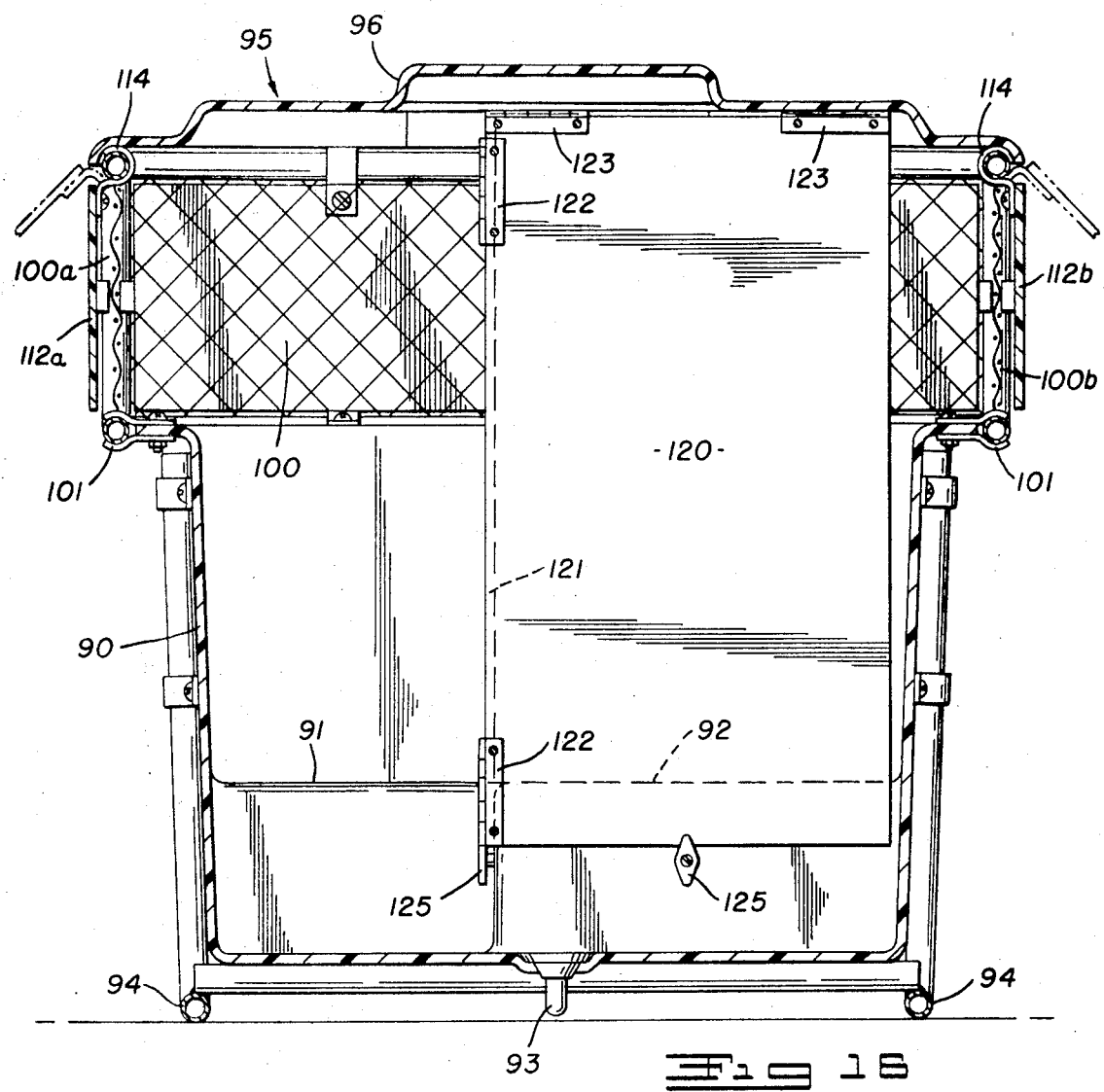
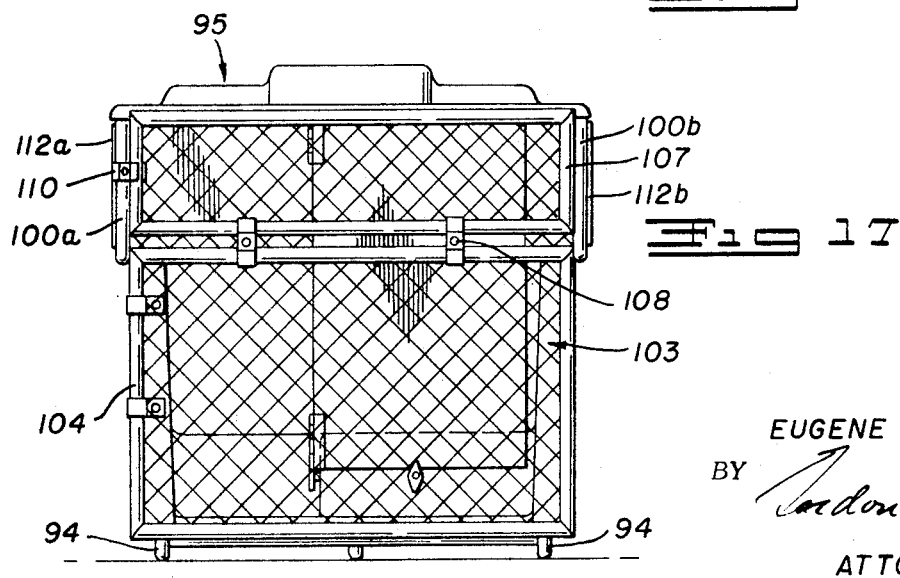

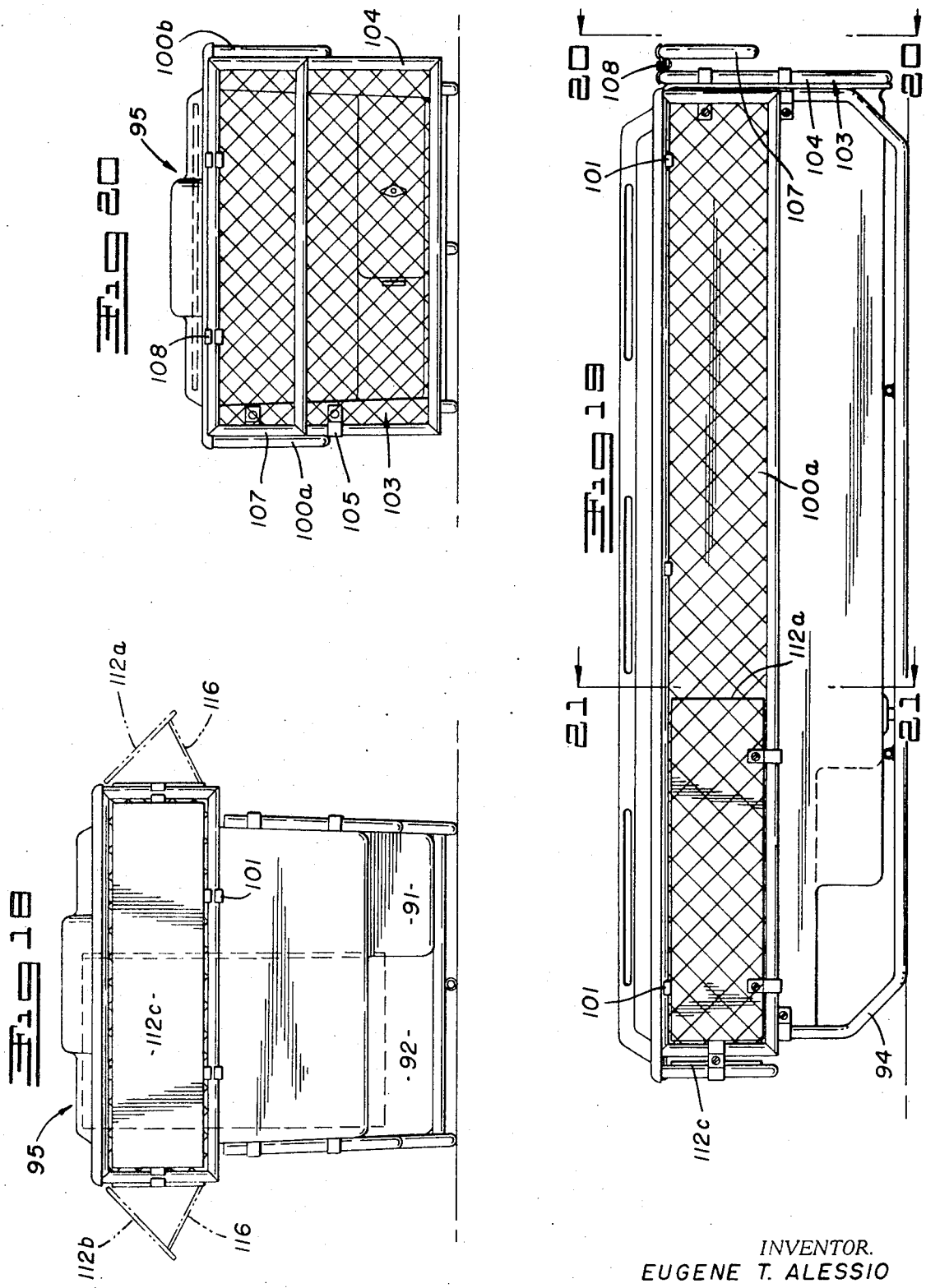

INVENTOR.
EUGENE T. ALESSIO
BY
ATTORNEY

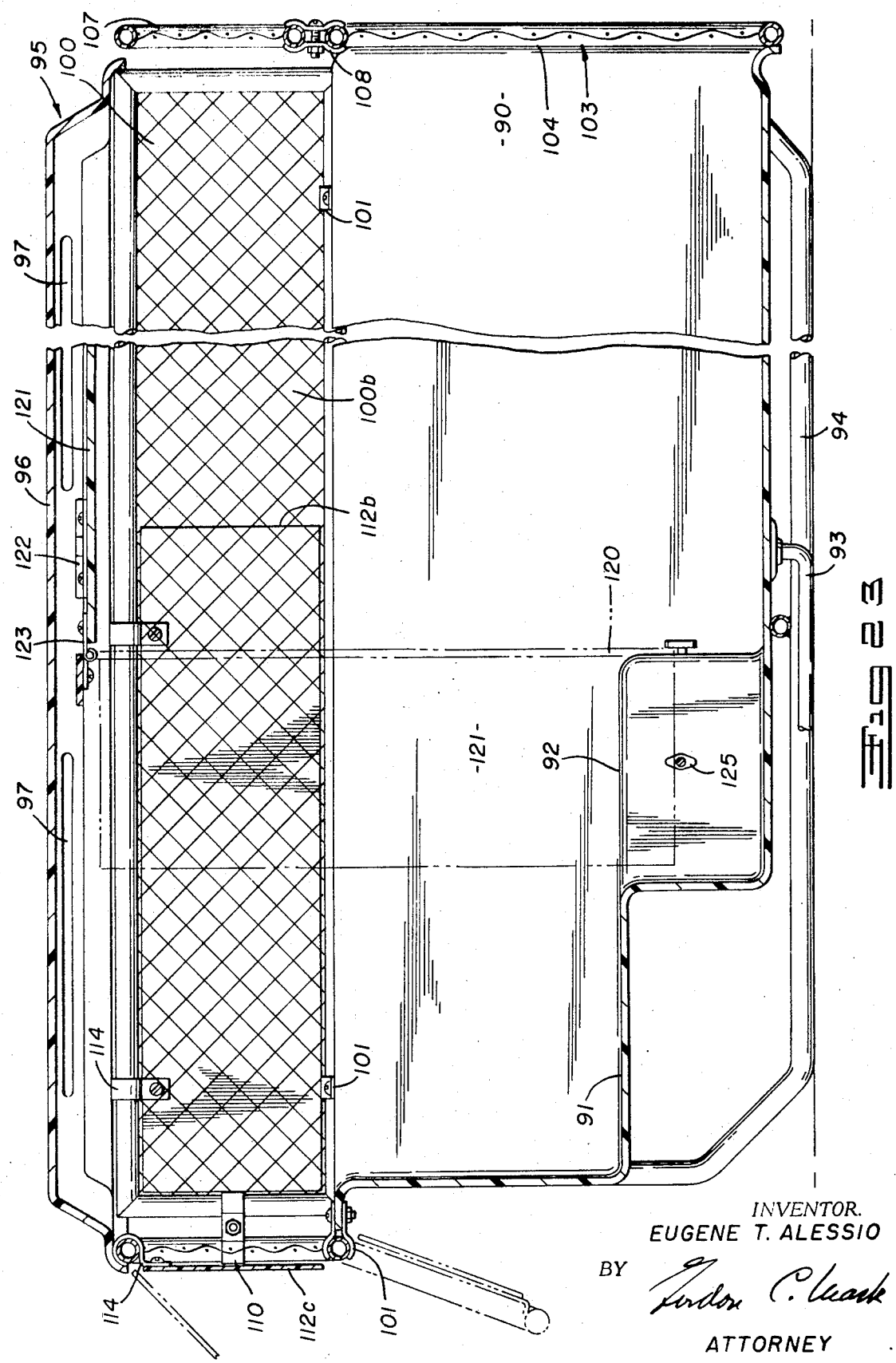

ANIMAL CAGE

An animal cage is provided as a unit of such a shape that a number of the cages can be stacked one on top of the other and also a number of the cages can be placed side-by-side to form a battery. The cage is desirable for home use and also for use by a veterinarian or the like who has the care of many animals. The cage which is designed for use by dogs, monkeys and other animals, etc., may be used as a maternity ward or a place for intensive care or post-surgical recovery or an observation enclosure or an exercise cage, etc.

A feature of the invention is the construction of at least a lower part of the cage which is molded from reinforced plastic. Thus, this part of the cage is free of seams and also free of cracks, etc., in which bacteria and fecal matter might collect. Not only would the collection of such material be objectionable because odoriferous, but in such a cage which is to be used from time to time by different animals or in a battery of cages, odors or gases from such fecal matter and bacteria breeding there might infect a perfectly healthy animal placed in it or in a neighboring cage. The reinforced plastic is advantageously one which an animal will not chew, and which is resistant to water, disinfectants and the urine, etc. discharged by the animal.

The cage is preferably ventilated by a fan which draws air in through the door and exhausts it in such a way that it is discharged away from the environment of the cage, so that if there is a battery of cages and the animal in one of the cages has some respiratory difficulty or other disease, the air exhausted from his lungs and vapors and gases otherwise generated within the cage, will be carried away and will not infect an animal in a neighboring cage.

The drain in the floor is advantageously connected with a pipe system which will connect with the drain from other cages if there is a battery and, in any event, will remove any drainage from the environment of the cage. A drain connected individually with a pipe system is far less apt to spread contamination in a battery than the open trench which runs from one cage directly into another.

Various cage structures are disclosed. The shelf may cover the whole of the back end of the bottom portion of the cage, or just a portion of the back end. The upper portion of the cage may be made of wire, or it may be closed as by reinforced plastic, or it may be constructed so as to be thus open or closed from time-to-time, as desired. Many alternative constructions are disclosed.

Various types of cages are shown and their construction described. Thus the invention is illustrated in the drawings, in which FIG. 1 is a view in perspective of one type of cage with the door open;

FIG. 2 is a section on the line 2—2 of FIG. 1;

FIG. 5 is a longitudinal section of the bottom of the cage showing a heating unit in the floor of the cage;

FIG. 6 is a lateral section of the bottom of the cage showing the reinforcement of the floor of a cage;

FIG. 7 is a sectional view of the front of a cage made from only the top and bottom portions such as portions shown in FIG. 4;

FIG. 12 is a side sectional view of a modification which includes a small house attachment at the rear;

FIG. 13 is a section on the line 13—13 of FIG. 12;

FIG. 14 is a side view of another modification, erected;

FIG. 15 is a top plan view on line 15—15 of FIG. 14 of this modification;

FIG. 16 is a sectional view on line 16—16 of FIG. 14, erected;

FIG. 17 is a front view on line 17—17 of FIG. 14, erected;

FIG. 18 is a back view on line 18—18 of FIG. 14, erected;

FIG. 19 is a side view of this modification, collapsed;

FIG. 20 is a front view on line 20—20 of FIG. 19, collapsed;

FIG. 23 is a longitudinal sectional view from FIG. 15, erected.

Figure 1:
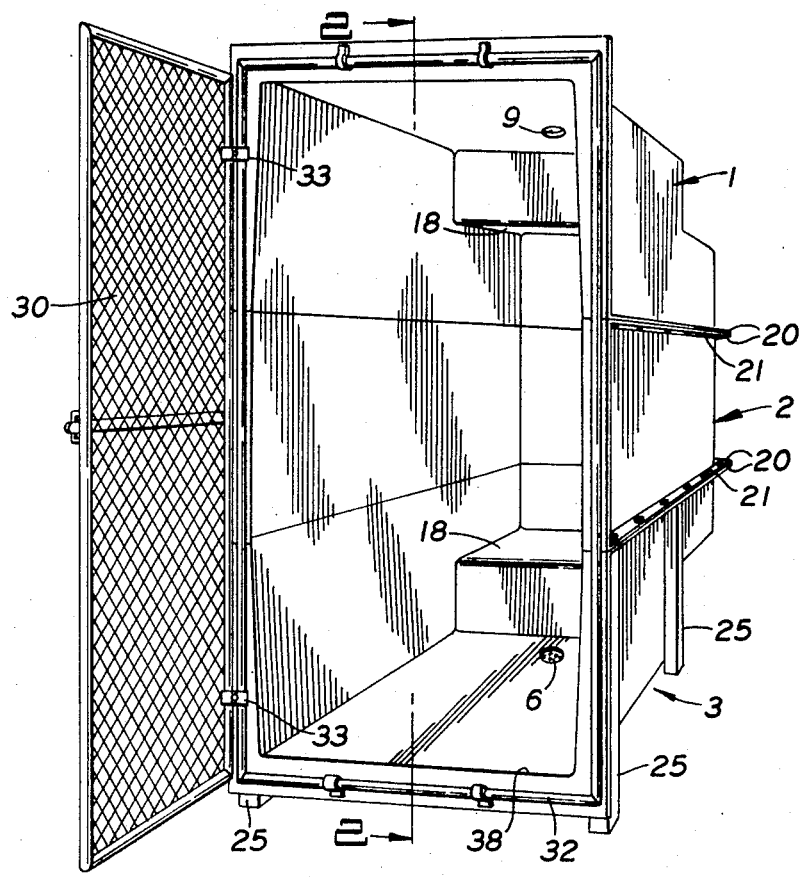
Figure 3:
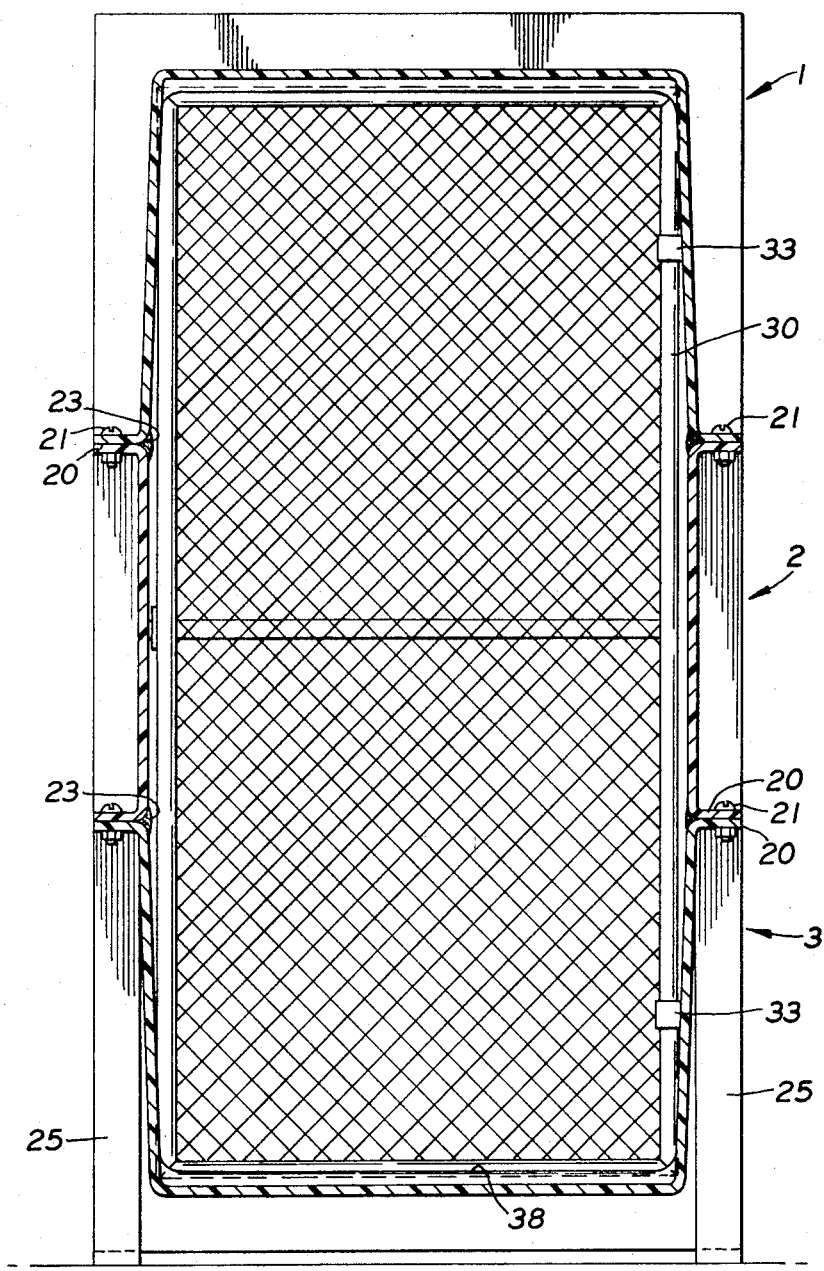
FIG. 3 is a section on the line 3—3 of FIG. 2.

The cage shown in FIGS. 1-3 is formed of a top portion 1, a middle portion 2, and a lower portion 3, all of which are molded from reinforced plastic. A glass-reinforced plastic such as polyester resin has proved most satisfactory because of its light weight and strength, but other plastics and other reinforcement may be used such as reinforced epoxy resin, a phenolic resin, ABS resin, formal and urethane foams, etc.

Figure 4:
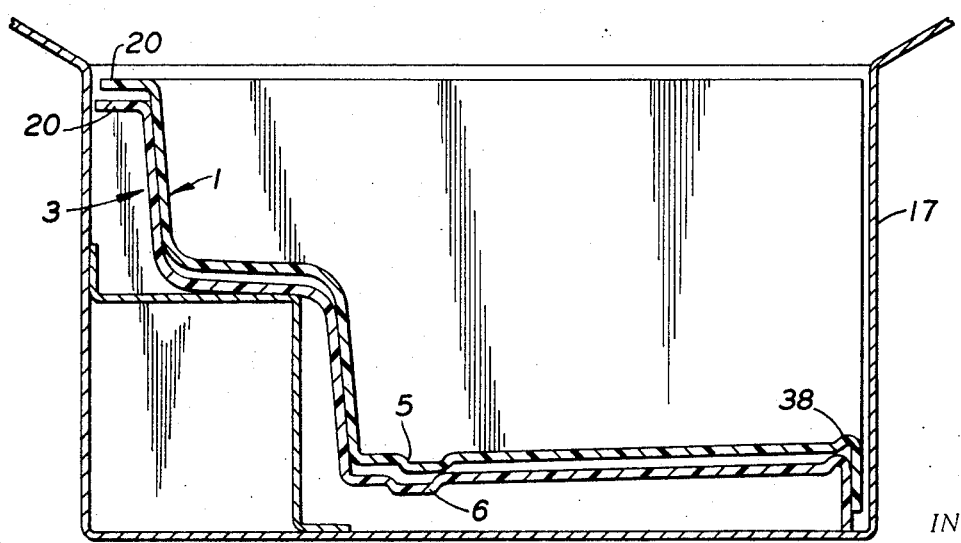
FIG. 4 shows upper and lower portions of a cage which are of substantially identical shape and nested for storage or shipment.

As is readily seen, particularly in FIG. 4, the top and bottom portions are identical. This figure shows the two sections nested and packaged for storage or shipment. The portions when new, as shown in FIG. 4, include a small indented circular area indicated by the reference numerals 5 and 6 in the respective portions. One or both of these indented areas may be easily cut out when the cage is assembled. The opening 6 may serve as a drain which in FIG. 2 is shown as being connected with the drain pipe 8. The opening 5 in the top portion may be fitted with a fan 9 and a vent pipe 10 which carries the vented air, etc. away from the environment of the cage. If the cage is indoors it may be vented outdoors. If the cage is one of a battery, by piping the exit gases away from the environment or outside of the building in which the cages are located, any bacteria, etc. coming from one cage will not contaminate an animal in an adjacent cage. Alternatively, air can be forced into the cage to remove objectionable gases and bacteria or any desired gas such as an anesthetic may be supplied.

It is desirable to provide an additional opening 15 in the top for insertion of a light 16 or other environmental control instrument such as a humidifier, dehumidifier, source of oxygen or other gas, heat lamp, ultraviolet light, etc.

The top and bottom portions are molded with a step 18. The step is desirable in the bottom portion to be used as a place where the animal can rest if the floor of the cage is dirty or while the cage is being hosed out. The step is shown as extending across the entire back of the bottom portion. It may cover only a portion of the back, and may be of any desired outline.

The walls of the top and bottom portions advantageously taper and broaden downwardly and upwardly, respectively, as well shown in FIG. 4, to permit the nesting of these portions. They may be nested in a carton 17 for shipment. Although only two portions are shown as nested in FIG. 4, in shipping the cages from a factory many more may be nested in a single carton or other container.

The cage shown in FIGS. 1-3 includes the central portion 2 which gives height to the cage. There may be a door in the back or a side of this portion 2, which door is easily accessible to the animal from the shelf. It may be a spring-operated door, or a guillotine door or a flap door, etc. The various portions of the cage are provided with flanges 20 which are brought together and bolted by bolts 21. The cracks between the portions are advantageously sealed by any suitable cement 23 to prevent the accumulation of bacteria, etc. in the cracks.

The cage is supported in any suitable manner. Legs 25 are shown as bolted or welded to the flanges 20 or attached in any other suitable manner, or the legs may be manufactured integrally with the bottom of the cage.

Any suitable door may be used. It preferably includes an open portion so that when the fan is operating air can enter through the door and sweep out the entire interior of the cage. In FIGS. 1 to 3, the door is shown as formed of a rectangular frame 32 with the wired frame 30 hinged thereto at 33. It is provided with any suitable lock (not shown).

The cage is hosed out from time to time, and during this time the animal will usually rest on the shelf 18. The animal can be removed for more thorough cleaning when that becomes desirable. The drainage from the hosing will be carried away from the environment of the cage through the drain 6, and if there is a battery of cages the drain pipes 8 can be combined and will run to a sewer or any other suitable location.

The cage can be disassembled from time to time and be readily reassembled. The top and bottom portions can be nested and packaged as shown in FIG. 4 for shipment.

The floor is advantageously provided with a lip 38 to retain matter, such as water used in hosing out the cage. As shown in FIG. 5, the floor may be heated by the coil 40. The coil can be cemented or otherwise fastened directly to the underside of the floor, or it may be contained in a compartment which serves to reinforce the floor.

If the cage is made of very light-weight construction, some suitable reinforcement will be desirable, and FIG. 6 shows the floor reinforced with a piece of plywood 45, which is notched at several places 46 on its upper surface so that it can be bent to conform to the shape of the floor which drains from the sides toward the middle to the drain 6. Other desirable reinforcement includes honeycombed foam, etc.

FIG. 7 shows a cage made of the top portion 1 and the bottom portion 3, omitting the center portion. It shows a wire door 50 suitably hinged.

Figure 8:
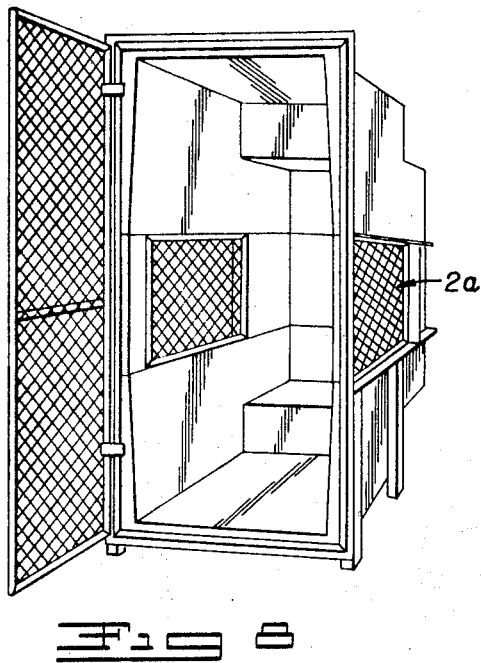
FIG. 8 is a cage of similar construction but made of three sections and with wired windows in the walls.

FIG. 8 is of similar construction, but the central portion 2a is made with wire windows. Otherwise the construction is similar to that illustrated in FIG. 1.

Figure 9:
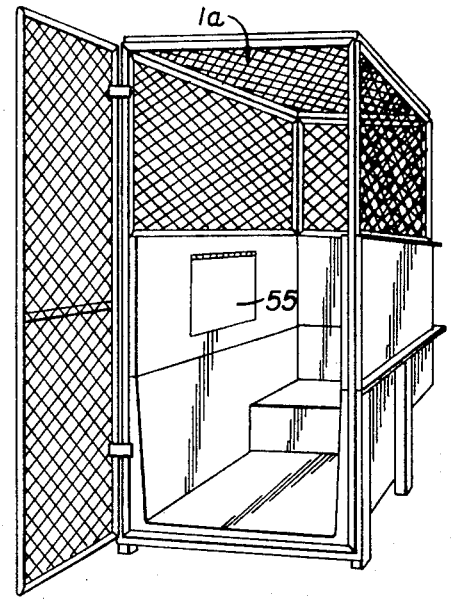
FIG. 9 is a cage of similar construction but with the top portion composed of wired frames and a door.

The construction of the cage shown in FIG. 9 is similar to that shown in FIG. 8 except that the top section 1a is made of wire frame, and a door 55, preferably a flap door, is provided in the intermediate section for access to the cage. Such a door may be provided in the back wall or any side wall at any desired height from the floor. It may swing freely on hinges, or be hinged for admittance, only. It may be of any desired construction.

Figure 10:
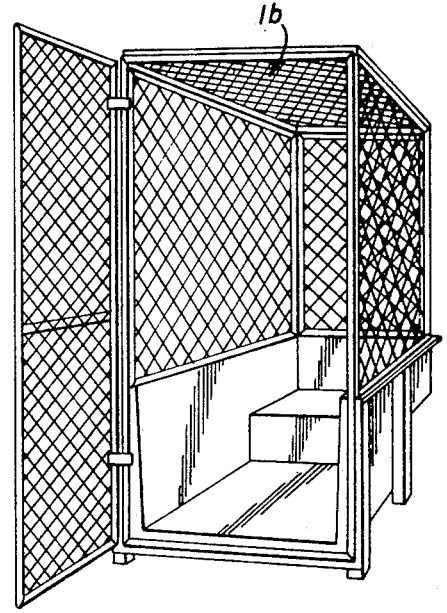
FIG. 10 is a type similar to FIG. 9 but with a larger portion of the upper part constructed from wired frames.
Figure 21:
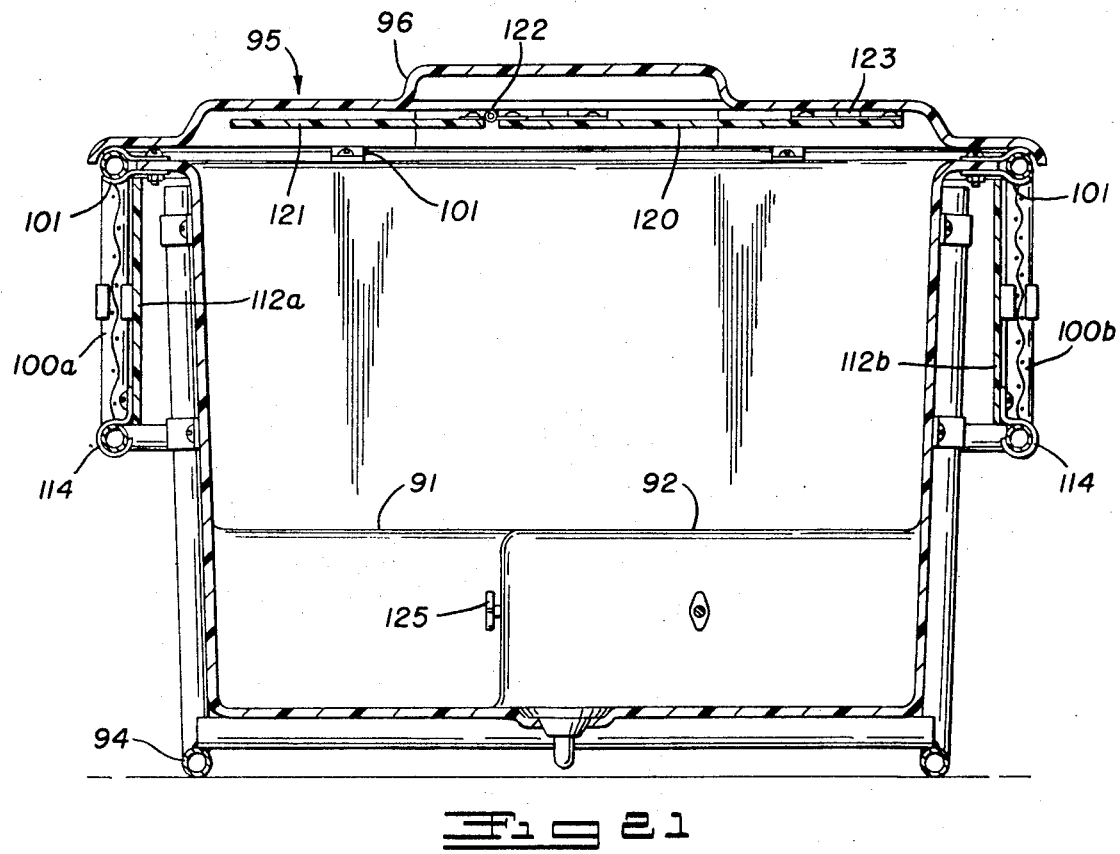
FIG. 21 is a sectional view on line 21—21 of FIG. 19, collapsed.
Figure 22:
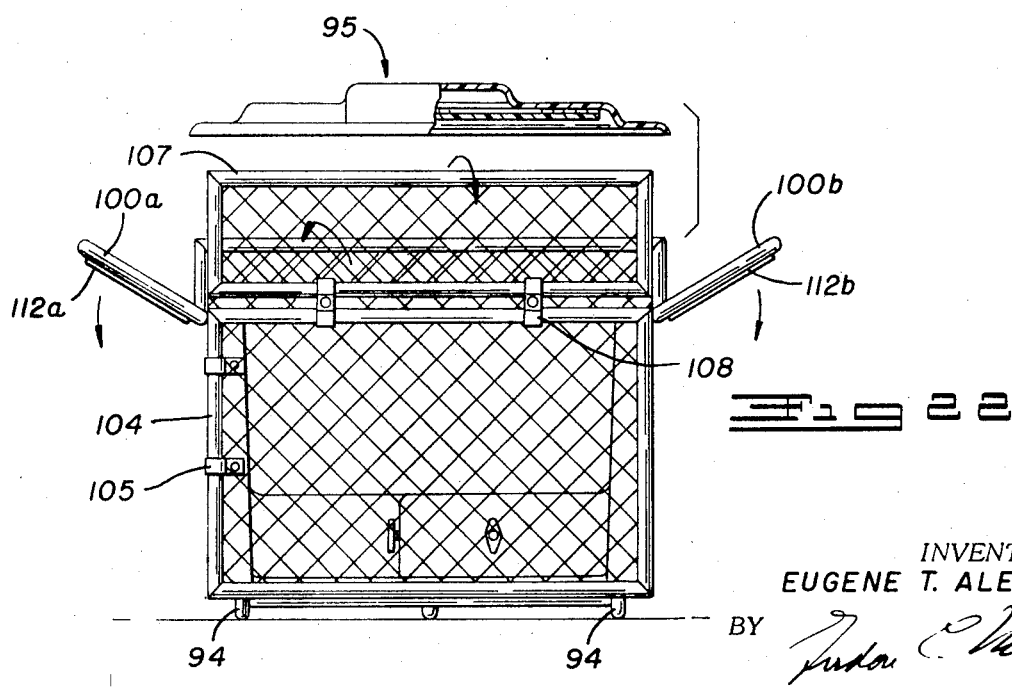
FIG. 22 is a front view of this modification, exploded, showing the top portions being folded down.

The structure shown in FIG. 10 is similar, but the top and middle sections 1b are both made of a single wired frame. Thus the cage may be readily made of any height with a standard bottom portion; also the size of the bottom portion may be varied. The structure shown in FIGS. 9 and 10 are designed for inside use, because for outside use a top portion which protects from the weather is necessary, or at least usually desirable.

Figure 11:
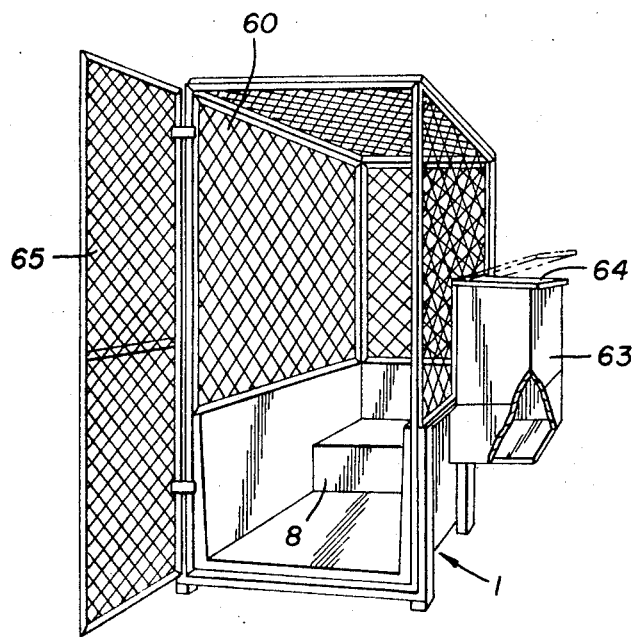
FIG. 11 is a perspective view, partly broken away, of a modification of the structure shown in FIG. 1 which includes a small house attachment at the side for a dog or other small animal or animals.

FIG. 11 is a modification which utilizes the bottom section 1 with the step 8. This figure shows the middle and top sections made of a wire frame, but it is to be understood that this wire frame 60 may be of any height desired. More or less of the wire may be replaced by paneling.

A novel feature of the cage shown in FIG. 11, is the house 63 at the side of the cage, which is provided with a hinged door 64 to be opened for insertion or removal of an animal as well as for cleaning and for observation of the animal. Alternatively or in addition, a door may be located in the front, back or side wall or even in the floor, and a house or the like such as 63 is particularly desirable if the animal is a female and bears young on the shelf 8. The bottom of the house is level with the shelf and the door 64 gives ready access to animals on the shelf. The house 63 is advantageously formed of reinforced plastic of the same composition as the bottom 1. The cage is provided at the front with a door 65 of the same construction as shown in FIGS. 1-3, which door is suitably mounted and provided with a suitable locking arrangement.

Instead of having the house 63 at the side of the cage, a somewhat similar house may be at the back of the cage. Such a cage is illustrated in FIGS. 12 and 13. The house 70 is built over the shelf at the rear of the cage. The roof 72 is hinged at the front at 73 to provide easy access to the interior. A partition separates the house from the balance of the cage. The top 75 of the partition extends across the whole of the back of the cage. The bottom portion 76 of the partition extends only part way across the cage and the opening 77 permits the dog or other animal to climb on to the portion 78 of the shelf behind the door and then crawl behind portion 76 of the partition to be protected from the light and wind. The floor 79 of the house is level with the shelf.

FIGS. 14 to 23 illustrate a further modification. This cage is built with means for screening off an animal, and the upper portion can be folded down to reduce the height of the cage for transportation, etc. The cage, when collapsed, may be transported in a helicopter.

The front part of the cage may be large enough for a man to sleep in. Thus, it is adapted to a variety of uses. The drawings show one adaptation in which the lower portion is formed of reinforced plastic; the upper portion is of wire screening and the shelf is L-shaped. Various structural changes will suggest themselves to persons skilled in the art.

FIG. 23 clearly shows the bottom portion 90 molded of reinforced plastic. The shelf, located across the back of the cage is L-shaped with a portion 91 extending across the entire back of the cage and the portion 92 extending forward from the portion 91, as viewed in FIG. 23. Drain 93 is provided, and the cage is advantageously mounted on skids 94 to facilitate movement from one place to another.

In the modification shown, the top of the cage cannot be telescoped into the bottom, but in some variations of this modification this is possible. The top 95 is provided with a raised area 96 in which there are vent openings 97. A fan may be provided to enforce ventilation, but this is not necessary.

The upper portion of the walls 100 (as best shown in FIGS. 14 and 23) is a screen. The three sides of this screen are hinged at 101 to the molded reinforced plastic bottom 90, and the door 103 (which is shown as a screen) is formed of a lower portion 104, hinged to the reinforced plastic at 105, and an upper portion 107 hinged at 108 to its lower portion. When erect, the side walls 100a and 100b (FIG. 21) and the top portion 107 of the door are held erect by couplings 110 at each side of the door.

As will be explained, the back portion of the cage may be screened off from the front portion, so as to provide a dark place for the animal to sleep. To further protect the animal from the light, solid flaps 112 a and b at the sides of the cage and flap 112c (FIGS. 16 and 19) at the rear, which are made of reinforced plastic, metal or other suitable composition are hinged to the tops of the screens 100 at 114 so that they may be lowered and raised (FIG. 16) as desired. To facilitate this, hinged supports 116 (FIG. 18) are provided.

When the top of the cage is to be collapsed, the top 95 is removed, flaps 112 are folded against the upper portions 100 of the cage, and these upper portions 100 are swung down (FIG. 22) against the reinforced plastic 90 (FIGS. 19–21) and preferably held there by suitable means. The upper portion 107 of the door is swung against the lower portion 104 (FIGS. 20, 21) and preferably held there by suitable means. The top 95 is replaced (FIG. 20).

Reference has been made to screening off the back part of the cage. Usually the screen will not extend the entire width of the cage, but will permit the animal to go from the front of the cage up on to the portion 91 of the shelf. The screen is advantageously made in two parts, viz. 120 which swings down over the front of portion 92 of the shelf (FIG. 16) and the portion 121, fastened to it by hinges 122, which portion 121 is swung against the side of shelf 92 (FIGS. 14 and 23). When not in use, portion 121 is swung forward against the front of portion 120, and then this portion 120 is swung up (FIG. 23) on hinges 123 (FIG. 16) and fastened in the top 95 of the cage. The portions of the screen are fastened to shelf by turn-knobs 125 (FIG. 16) or other suitable means.

This cage shown in FIGS. 14–23 is designed particularly for an animal which is to be moved from place to place, and wants the light screened from him when he wants to sleep.

I claim:

1. An animal cage structure comprising a bottom section molded of plastic material free of seams, said section including a floor portion sloping from the front thereof toward an upwardly extending portion terminating in a substantially horizontal portion forming a shelf which slopes to said upwardly extending portion, said section further including substantially vertically extending side walls and a rear wall attached with said floor portion, said shelf being attached to said rear wall, drain means in said floor portion near the upwardly extending wall and means for closing the front of said bottom section.

2. The cage structure of claim 1 in which the plastic is reinforced.

3. The cage structure of claim 1 in which the plastic is polyester and is reinforced with glass.

4. The cage structure of claim 1 which is substantially rectangular and includes walls on three sides thereof and is provided with a door opening on the fourth side, with the shelf opposite it, and a lip across the bottom of said opening molded integrally with the floor and said walls.

5. The cage structure of claim 1 in which wire mesh extends upwardly from said bottom section.

6. The cage structure of claim 1 which includes a top portion substantially identical with the plastic material and nestable therein when not fastened to the bottom section.

7. The cage structure of claim 1 which includes at one side or the rear a house with its bottom at substantially the level of the shelf and accessible from within the cage, the house having a door therein.

8. The cage structure of claim 1 with a roof to which partitioning means is hinged, which partitioning means when lowered contacts the front of the shelf.

9. The cage structure of claim 8 with the shelf across the rear, in which cage the partitioning means extends across only a portion of the front of the shelf.

10. The cage structure of claim 9 in which a portion of the shelf extends farther forward than the balance of the shelf and the partitioning means when lowered contacts substantially the whole of the perimeter of said portion of the shelf which extends farther forward then the balance.

11. The cage of claim 1 with a roof which is removable.

12. The cage structure of claim 11 which includes wire mesh between the section and the roof.

13. The cage structure of claim 12 in which solid wall material is hinged to the top of the wire mesh.

14. The cage structure of claim 12 in which the wire mesh extends to the roof except at the door to the cage, the entire wire mesh is of substantially the same height and hinged to the wall below it so that the wire mesh can be swung outward and down against the wall below it, reducing the height of the cage, the roof being adapted to fit on the cage when the wire mesh is thus swung against the wall below it.

15. The cage structure of claim 13 in which the wire mesh extends to the roof except at the door of the cage, the entire wire mesh is of substantially the same height and hinged to the wall below it so that the wire mesh can be swung outward and down against the wall below it, thereby reducing the height of the cage, the roof being adapted to fit on the cage before and after the wire mesh is thus swung down against the wall below it.

16. The animal cage structure of claim 1 in which the drain means is an opening which leads directly to a pipe, and there is a porous cover over the drain means.

* * * * *